2,790,502
FIRE FIGHTING

Charles F. Teichmann, Crestwood, and Rex P. Mulligan, White Plains, N. Y., assignors to Texaco Development Corporation, New York, N. Y., a corporation of Delaware No Drawing. Application December 29, 1953, Serial No. 401,050

16 Claims. (Cl. 169—1)

The present invention relates to preventing initial or continued combustion of a pool of organic oil, and more particularly concerns an improvement in the method of fighting fire in a pool of oil by depositing on the surface of the oil a thick blanket of foam which is characterized by non-inflammability and the presence of carbon dioxide or other combustion preventing gas therein to smother a fire. Furthermore, the invention includes novel compositions of matter for producing such a blanketing foam.

The fighting of oil fires by depositing a cooling and smothering foam blanket on a burning pool of oil is well known, for example, as reported in Handbook of the Petroleum Industry, volume II, pages 318, 419–420, published in 1922. Also see Oil Refinery Specifications, page 114, published by the Chemical Publishing Company in 1924; and the article in Colloid Chemistry, volume IV, page 667, published by the Chemical Catalogue Company, Inc., in 1932.

In the foam method for fighting fires one composition depends upon the use of an acid component such as aluminum sulfate or iron sulfate, and an alkali metal carbonate such as sodium bicarbonate which react together in water solution to generate a foam composed of numerous bubbles containing carbon dioxide. The foam generally is stabilized by a suitable agent such as extract of licorice, or other materials such as glue, glycerin, glucose, sodium sulfonate, saponin, and quillaia bark. In the following description, for simplicity, the ingredients sodium bicarbonate and aluminum sulfate will be employed as representative of alkali metal carbonates and acid compounds, respectively.

The foam generating ingredients can be mixed together in powdered form and then added to a static or moving body of water to generate foam in a volume which is eight or more times the volume of water used. Another way to generate the foam is first to add the aluminum sulfate to one body of water and the sodium bicarbonate, with or without a stabilizing agent, to a second body of water; and then to bring the two water solutions together in any suitable way to generate foam under pressure resulting from the production of carbon dioxide in the reaction. Still another procedure involves aspiration of the aluminum sulfate powder into one stream of water and aspiration of the sodium bicarbonate plus stabilizer powder into a second stream of water, after which the two streams merge to form a single flowing stream of foam which is deposited upon the burning pool of oil.

In accordance with the present invention there is provided a novel method of preventing initial or continued combustion in a pool of an organic oil by introducing into at least a surface layer of the oil a small quantity of a liquid organo silicon polymer characterized by its ability to raise the flash and fire points of the oil. Specifically, this is accomplished by applying on the surface of the pool a mass of non-inflammable and combustion inhibiting water-base foam having distributed therein a small quantity of liquid organo silicon polymer such as a silicone, or other materials which will be described more in detail hereinafter. At least part of the liquid organo silicon polymer migrates from the foam blanket, becomes dispersed locally in a surface layer of the oil, and acts to raise the flash point and the fire point of the surface portion, thus coperating with the blanketing and cooling effects of the foam to prevent combustion either of a continuing nature or by ignition from a nearby fire. Polymer without foam also can be released onto a pool from a reservoir on or near the oil tank. Supplying the silicon polymer in a free and unconfined state is particularly advantageous where fire prevention rather than fire extinguishment is desired since in the former heat is not available to destroy a closed container of the polymer for release to the oil.

The effectiveness of organo silicon polymers in cooperation with foams for fire fighting is surprising and unpredictable because it is well known that such polymers can be expected to have a foam preventing or foam breaking effect on many liquids which ordinarily tend to foam. Actual tests have shown, however, that as much as 0.5% by volume of liquid dimethyl silicone has no effect on the foam generating qualities of foam generating solutions of the type described above.

Typical liquid organo silicon polymers which can be used in cooperation with the foam, as described above, include concentrated products of organo-silicon oxides such as those condensation products containing a plurality of silicon atoms linked through oxygen atoms, each silicon atom having attached thereto at least one organic radical. Such compounds have come to be called silicones by reason of their containing the so-called silicone radical, i. e.:

Compounds of this type may be formed by polymerization or condensation of organo-silicols, the latter including mono-, di-, and trisilicols as well as various mixtures thereof.

Such compounds may be represented by the following formula:

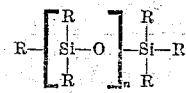

in which $n$ is 1 or more and R represents similar or dissimilar organic radicals such as alkyl, aryl, aralkyl, alkaryl or heterocyclic groups, or the terminal R's may be substituted by hydroxyl groups, or all but one of the R's attached to the silicone atom can be substituted by hydroxyl groups or halides.

Such condensation products may be formed as straight chains, cyclic or cross polymerization products and may be liquids or solids.

Preferably R is a single organic radical of low molecular weight such as methyl, ethyl and short chain alkyl groups. Compounds having organic radicals of high molecular weight such as phenyls or compounds containing organic radicals of both high and low molecular weights can be used.

A preferred compound is dimethyl silicone having the following formula:

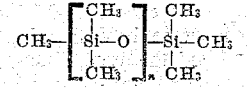

in which $n$ is 1 or more. In most cases it is believed that the product contains a number of such polymers of different chain lengths and perhaps different chain types. Viscosity can range from as low as .65 cs. (centistokes kinemtaic at 100° F.) to as high as 1,000,000 cs., with 100–1,000 cs. viscosities being preferred.

Another class of organo-silicon oxide condensation products capable of use in practising the invention are the organo-silicate condensation products represented by the following formula:

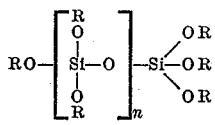

in which $n$ is 1 or more and R likewise represents similar or dissimilar organic radicals such as alkyl, aryl, alkaryl, aralkyl or heterocyclic groups. Such compounds may be prepared by controlled or partial hydrolysis of the tetra-orthosilicate esters with water. Again organic radicals of low molecular weight such as methyl and ethyl are preferred although it is to be understood that radicals of higher molecular weights can be used alone or in combination with radicals of low molecular weight.

As an example of the unusual properties of such compounds for raising the flash and fire points of petroleum compounds laboratory experiments showed that several different oil compositions containing a certain additive, identified herein as additive A, had their flash points raised between 5 and 60° F. and their fire points raised between 10 and 15° F. by the incorporation of only small amounts of dimethyl silicone thereto. The dimethyl silicone was prepared as a kerosene concentrate, sufficient kerosene being added to 10 grams of the silicone fluid to bring the total volume up to 100 milliliters. The silicone fluid added to the kerosene had a viscosity of 100 cs. at 80° F., a specific gravity of 0.9733, and a silicon content of approximately 35.7%. The proportions of dimethyl silicone added to the oils varied from 0.05 p. p. m. (parts per million) to 50 p. p. m. by weight.

In one case, the flash point of a typical oil of No. 10 grade was raised 10° F. by only 5 p. p. m. of dimethyl silicone by weight. The same oil in a 30 grade was raised 30° F. and in a 50 grade was raised 60° F., the same quantity of dimethyl silicone being used in each case. Actual tests on other types of oils showed increases in flash point of as much as 5° F. with the use of only 0.05 p. p. m. of the silicone and up to 55° F. increases with 2 p. p. m. of silicone.

In another instance, the fire point of an oil was raised 15° F. by the addition of 50 p. p. m. of silicone. Generally the increase in fire point is not as great as the increase in flash point.

From the tests conducted thus far, it appears that the addition of only a small quantity of the silicone compound effects the maximum rise, any additional compound being ineffective to raise the flash or fire points higher. For example, one oil was tested throughout a considerable range as shown in the following table:

| P. p. m. silicone added: | Rise in flash point, ° F. |
| --- | --- |
| 0.05 | 5 |
| 0.1 | 10 |
| 0.25 | 30 |
| 0.50 | 25 |
| 1.0 | 20 |
| 100 | 25 |
| 1000 | 20 |

The above indicates a maximum raising of flash point of this particular oil at concentrations between 0.1 and 0.25 p. p. m. silicon. In excess of 0.25 p. p. m. in this case did not further increase the flash point.

In addition to oils of the type discussed above, tests have been made on other types of petroleum compounds such as road oil and roofing saturant, the content of the latter being asphalt. 10 p. p. m. of the silicone compound was found to raise the flash point of the road oil 80° F. 1 p. p. m. of the compound was found to raise the flash point of different roofing saturants from 25°–55° F. The fire points of the same saturants was raised approximately 20° F.

All flash and fire tests were made according to ASTM–D 92–46 otherwise known as U. S. Government method 110.33, the tests also being called the Cleveland Open Cup (COC) tests.

When applying silicone to oil in a foam blanket by the present invention only a relatively small proportion of the silicone in the blanket, perhaps 10% as a maximum, actually enters the oil to raise its flash and fire points. Therefore, considerable excess silicone should be employed over that theoretically required for optimum results. For example, up to 0.5% by volume of silicone based upon the unfoamed liquid is satisfactory, and it is desirable that at least .01% be used although even smaller quantities still have a salutary effect.

Based upon the mixed powder for producing foam .05 to 3% by weight of silicone is satisfactory although even lesser quantities are effective. Based upon the generated foam .001% to .06% of silicone by volume should be present in the foam although quantities both below and above this range are effective.

Specific procedures for generating fire extinguishing foam are well known, for example as described by the American-La France-Foamite Corporation in booklets entitled Foamite Dry Powder Fire Extinguishing System (copyright 1947), and Modern Fire-Fighting Equipment Catalogue (No. 48, copyright 1947). Therefore, only brief descriptions will be given below.

In one modification a dry mixture of aluminum sulfate, sodium bicarbonate and a stabilizer such as powdered licorice extract is made up in proportions of approximately 54% aluminum sulfate, 33% sodium bicarbonate and 13% powdered licorice extract by weight. By a "dry" mixture we refer to one which is free of uncombined water, but it is to be understood that such a "dry" mixture may include water of hydration associated with any of its ingredients. To this powder is added 2% of liquid dimethyl silicone polymer having a kinematic viscosity of 100 cs. and the whole mass is intimately mixed together so that the silicone liquid becomes uniformly dispersed therein. This water-dry powder is then used for generating foam by placing it in a conventional powder dispenser connected into a water conduit so that as the powder trickles into the water the ingredients mutually react to give large volumes of foam which are discharged from a nozzle onto the oil pool which may or may not then be burning. A suitable range of composition is 25–45% sodium bicarbonate or other carbonate, 45–65% aluminum or other sulfate, and organo silicon polymers up to 3% by weight, any balance being licorice or other foam extender.

In another modification the powdered ingredients are fed separately from separate dispensers into two water conduits, the sodium bicarbonate+licorice extract in dry powdered form being fed into one water conduit and the aluminum sulfate in dry powdered form being fed into the other. The two liquid streams are then brought together in a single water conduit to react and generate foam. In this modification liquid silicone polymer can be incorporated in either or both of the sodium bicarbonate and aluminum sulfate phases for dispersal in the foam. In the carbonate the silicone should be added in an amount up to 8% by weight of the base chemical; in the sulfate up to 5%.

Instead of introducing powders into flowing streams of water the ingredients of the foam-forming materials can be dissolved in separate highly concentrated solutions, and these solutions can be bled from suitable containers into the separate water streams which later are combined for foam generation. In this modification it is best to introduce the silicone from a separate tank into the flowing water streams or the combined foam streams since it otherwise tends to float on the surfaces of the concentrated solutions and may not bleed uniformly into the conduits. Such separate introduction of silicone also can be employed when foam-forming powders are used as described hereinabove.

In still another modification, as used in the conventional portable fire extinguisher of the invertable type a first water solution is made up with aluminum sulfate and placed in one compartment of the fire extinguisher tank, and a second water solution, is made up with the sodium bicarbonate together with licorice extract (in either liquid or powdered form) and added to a separate compartment of the tank. Liquid silicone polymer in the proper amount is then added to either or both of the solutions so as to float on the top due to its lower specific gravity of about 0.969. Upon inverting this tank the two liquid solutions mix together and generate foam, while the silicone rises through the liquid and becomes intimately dispersed in the foam. The resulting silicone-bearing foam is forced out by $CO_2$ pressure through a discharge hose leading from what is normally the top of the fire extinguisher but is now the bottom.

The principles of the invention have been described above primarily as applied to foam generating compositions made up of aluminum sulfate and sodium bicarbonate. However, organo silicon polymers also can be incorporated in other types of foam generating materials such as a powdered composition of a highly concentrated proteinaceous material of vegetable origin which is incorporated in water to generate the foam. Only 6 parts of this material to 94 parts of water generates a large volume of foam for fire fighting.

Obviously many modifications and variations of the invention as above set forth may be made without departing from the spirit and scope thereof, and, therefore, only such limitations should be imposed as are indicated in the appended claims.

We claim:

1. A method of preventing combustion in a pool of organic oil, said method comprising introducing onto the surface of said pool a mass of non-inflammable and combustion inhibiting water-base foam having distributed therein a small quantity of liquid alkyl silicone polymer characterized by its ability to raise the flash and fire points of said oil when dispersed therein, part of said liquid alkyl silicone polymer entering a surface portion of said oil and acting to raise the flash and fire points of said surface portion whereby combustion is prevented by the flash and fire point raising effect of said polymer cooperating with the blanketing and cooling effects of said foam.

2. A method of preventing combustion in accordance with claim 1, wherein said alkyl silicone is dimethyl silicone.

3. A method of extinguishing a fire in a pool of burning organic oil, said method comprising bleeding into a flowing stream of water foam-inducing chemicals carrying therewith a small quantity of liquid alkyl silicone polymer characterized by its ability to raise the flash and fire points of said oil when dispersed therein; delivering onto the surface of said pool a stream of non-inflammable combustion inhibiting blanketing foam produced by the action of said foam-inducing chemicals on said water, said foam having said liquid alkyl silicone polymer dispersed therein; part of said liquid alkyl silicone polymer from said foam entering a surface portion of said oil and acting to raise the flash and fire points of said surface portion, whereby said fire is extinguished by the flash and fire-point raising effect of said polymer cooperating with the blanketing and cooling effects of said foam.

4. A method of extinguishing a fire in a pool of burning organic oil, said method comprising bleeding into a flowing stream of water foam-inducing chemicals; subsequently separately bleeding into said stream a small quantity of liquid alkyl silicone polymer characterized by its ability to raise the flash and fire points of said oil when dispersed therein; delivering onto the surface of said pool a stream of non-inflammable combustion inhibiting blanketing foam produced by the action of said foam-inducing chemicals on said water, said foam having said liquid alkyl silicone polymer dispersed therein; part of said liquid alkyl silicone polymer from said foam entering a surface portion of said oil and acting to raise the flash and fire points of said surface portion, whereby said fire is extinguished by the flash and fire-point raising effect of said polymer cooperating with the blanketing and cooling effects of said foam.

5. A method of extinguishing a fire in a pool of burning organic oil, said method comprising severally introducing into two separate bodies of water a pair of chemical compositions mutually reactive in water solution to generate gas and develop foam; introducing into at least one of said bodies of water a small quantity of a liquid alkyl silicone polymer characterized by its ability to raise the flash and fire points of said oil when dispersed therein; bringing said two bodies of water together whereby a large volume of non-inflammable, combustion inhibiting foam is generated carrying liquid alkyl silicone polymer therein; and depositing said foam on the surface of said pool of oil whereby said fire is extinguished by the flash and fire-point raising effect of said polymer on said oil cooperating with the blanketing and cooling effects of said foam.

6. A method in accordance with claim 5 wherein said two separate bodies of water are continuously flowing streams, and wherein said chemical compositions and said polymer are bled continuously into said streams.

7. A method in accordance with claim 5 wherein said two separate bodies of water are static masses contained within a tank, and wherein said masses are brought together in said tank to form said foam therein, said foam being discharged from said tank by the pressure of the gas generated therein.

8. A fire-fighting composition comprising a substance adapted to generate a large volume of non-inflammable combustion inhibiting foam when dissolved in water, and a small quantity of a liquid alkyl silicone polymer characterized by its ability to raise the flash and fire point of an organic oil when dispersed therein.

9. A water-dry composition adapted to react in water solution to develop a large volume of foam suitable for extinguishing a fire in a pool of organic oil, said composition comprising a comminuted intimate mixture of an alkali metal carbonate, a sulfate selected from the group consisting of aluminum and iron sulfates, a foam stabilizer, and a small quantity of a liquid alkyl silicone polymer characterized by its ability to raise the flash and fire points of an organic oil when dispersed therein.

10. A water-dry composition in accordance with claim 9, wherein said polymer is dimethyl silicone.

11. A water-dry composition in accordance with claim 9, wherein said carbonate comprises 25–45% and said sulfate comprises 45–65% of said composition by weight, and wherein said liquid alkyl silicone polymer is present in an amount up to 3% by weight.

12. A fire fighting composition adapted to react in water solution with another material to develop foam, said composition comprising a comminuted intimate mixture of an alkali metal carbonate with a small quantity of a liquid alkyl silicone polymer characterized by its ability to raise the flash and fire points of an organic oil when dispersed therein.

13. A fire fighting composition in accordance with claim 12 wherein said liquid alkyl silicone polymer is present in an amount up to 8% by weight.

14. A fire fighting composition adapted to react in water solution with another material to develop foam, said composition comprising a comminuted intimate mixture of a sulfate selected from the group consisting of aluminum and iron sulfates, with a small quantity of a liquid alkyl silicone polymer characterized by its ability to raise the flash and fire points of an organic oil when dispersed therein.

15. A fire fighting composition in accordance with claim 14 wherein said liquid alkyl silicone polymer is present in an amount up to 5% by weight.

16. A liquid fire fighting composition comprising a water solution of a substance adapted to generate a large volume of foam when reacted with a second substance, and a small quantity of a liquid alkyl silicone polymer floating on said water solution.

References Cited in the file of this patent

UNITED STATES PATENTS 2,543,672    Saxe et al. _____ Feb. 27, 1951